UNITED STATES PATENT OFFICE.

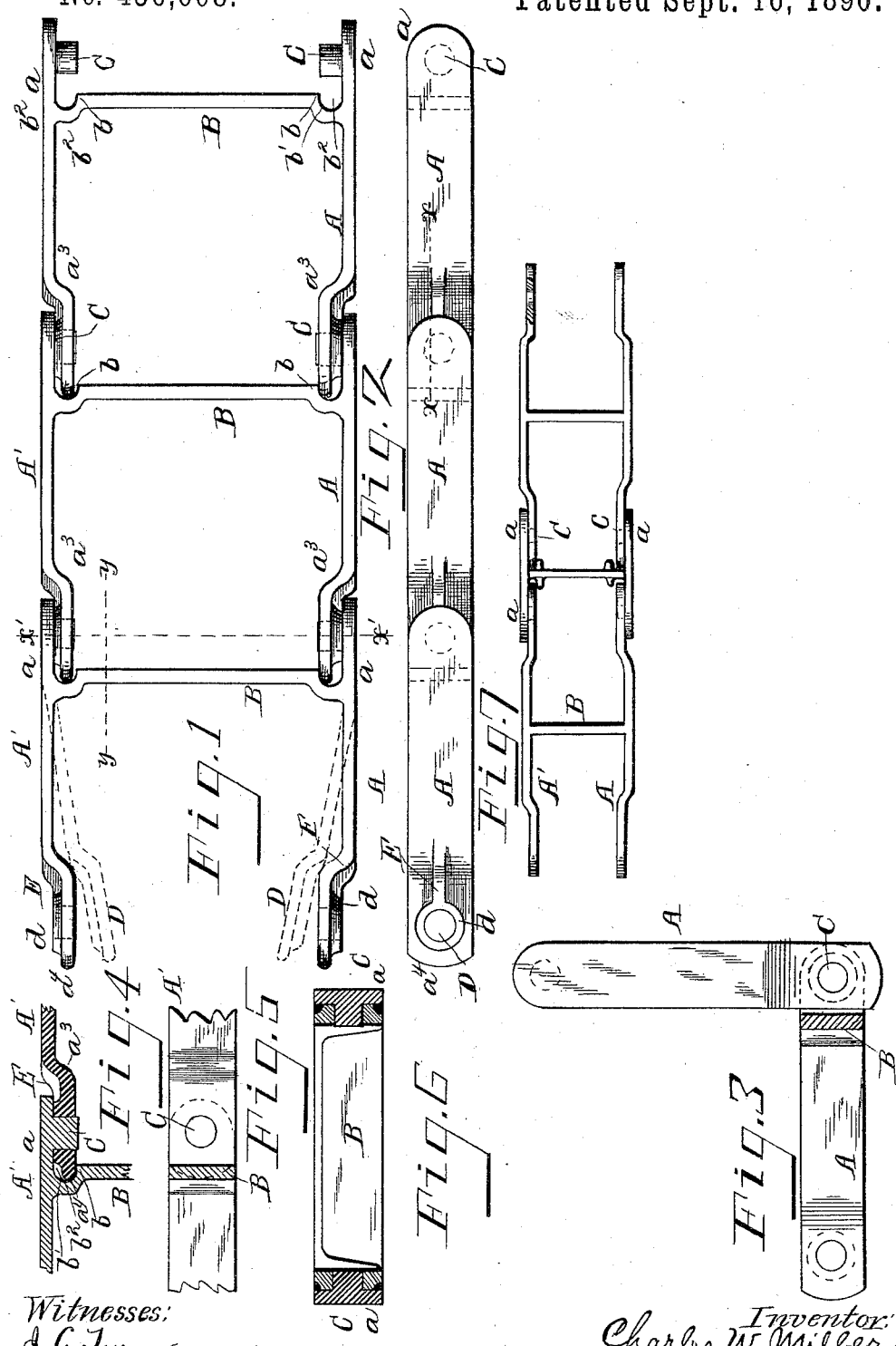

CHARLES W. MILLER, OF COLUMBUS, OHIO, ASSIGNOR TO JOSEPH A. JEFFREY, OF SAME PLACE.

DRIVE-CHAIN.

SPECIFICATION forming part of Letters Patent No. 436,608, dated September 16, 1890.

Application filed April 23, 1890. Serial No. 349,130. (No model.)

*To all whom it may concern:*

Be it known that I, CHARLES W. MILLER, a citizen of the United States, residing at Columbus, in the county of Franklin and State of Ohio, have invented certain new and useful Improvements in Chains, of which the following is a specification, reference being had therein to the accompanying drawings.

This invention relates to an improvement in chains. The novel features can be employed in making chains of any of several sorts, though they are particularly of value in making those in which the links are comparatively large, and which are used for drags, conveyers, &c.

Figure 1 is a plan view of several links of a chain, showing some of them with the parts in the positions occupied after they are coupled together and one with the side bars in the positions occupied just as they are being attached to an adjacent link. Fig. 2 is a side view of the chain. Fig. 3 shows two of the links in the positions occupied when they are being coupled or uncoupled. Fig. 4 is a partial longitudinal section on line $x\ x$, Fig. 2. Fig. 5 is a partial section on line $y\ y$, Fig. 1. Fig. 6 is a cross-section on line $x'\ x'$, Fig. 1. Fig. 7 shows a modification.

In the drawings, A A′ represent the side bars of one of the links, and B represents the end bar or cross-bar which joins said side bars. The side bars extend beyond this cross-bar B, the extending parts being indicated by $a\ a$. Each of the latter is formed with an inwardly-turned boss or projection C C, adapted to serve as a pintle for the adjacent link. At $b\ b$ shoulders or stops are provided, preferably produced by forming the cross-bar B with shoulders or offsets, as at $b'$, whereby recesses are formed at $b^2$.

At the other ends the side bars A A′ are formed with apertures D, adapted to receive pintles, as at C′, and to give a prolonged surface sleeves or thimbles are provided, as at $d\ d$, having the said apertures extending through them, and at E there are strengthening-webs adjacent to the thimbles or tubular bearings D. When the side bars are in working position, the ends with the apertures D D are in line with the recesses $b^2$ at the other end of the link, the side bars A A′ being curved inward at $a^3$. When the links are initially cast, the said ends are in the positions shown in full lines in Fig. 1, or they may be turned somewhat inward relatively to the lines they are in when in working position, as is illustrated by dotted lines in Fig. 1, for a purpose to be described.

The distance from the center of the aperture D to the upper or the lower edge of the side bar is a little less than the distance from the axis of the pintles C C to the edges of the shoulders $b\ b$. (See Fig. 3.) As a result of this, when two adjacent links are turned into an unusual position—say, for instance, turned to an angle of ninety degrees or thereabout with each other—the shoulders $b\ b$ present no hinderance to the escape of the side bars inward from the pintles; but it will also be seen that the distance from the center of the aperture D to the edge of the side bar at $a^4$ is greater than the distance from the axis of the pintles C to the edge of the shoulders $b\ b$, and therefore when the links are in line with each other, or in positions approximating that line, it is impossible for the side bars to escape from the pintles, said edges at $a^4\ a^4$ then lying in the recess at $b^2$ in such positions that they strike the said shoulders should they be moved inward. It will also be seen that, as the parts by which the engagement of one link with the next is effected all lie inside of the main parts of the side bars A $a$, a substantially unbroken edge is provided for the chain—that is, one without any outward-turned projections—the chain produced being therefore of the character of a ribbon chain.

All of the spaces between the cross-bars B B are left free, so that when used for conveyers there is an enlargement of capacity in this respect.

The manner of coupling one link to an adjacent one is as follows: The link being initially cast, as aforesaid, with the ends at $a^4\ a^4$ adapted to be bent, forced, or turned inward, two of the links are placed as shown in Fig. 3—that is, at an angle to each other—the free or diverging perforated ends of one being placed between the ends $a\ a$ of the other. Then said perforated ends are spread outward sufficiently to bring the pintles C C fully into the apertures D D, after which the links can be turned down into their operative position. If malleable metal be employed in their manufacture, the necessary spreading can be very readily attained. To uncouple one link from another, the last-described operation is reversed—that is to say, the two links are turned to the angle aforesaid—and the perforated ends of the one are caused to approach each other sufficiently to disengage them from the pintles; but such disengagement is not possible when the links are in working position, for the reasons above specified.

I am aware of the fact that heretofore use has been made of links having side bars and an end bar with outward-extending pintles in line with the end bar, and having the free or open ends of the side bars adapted to be spread or bent outward in coupling or uncoupling; but the above-described feature of my construction is one of material importance under many circumstances—namely, having the outer or edge surfaces of the chain unbroken by such projections as pintles.

Moreover, it is well known that with chains of this character there is a constant tendency for the separated ends of the side bars opposite to the cross-bar to be spread outward when the chain is being subjected to the strains met with in practical use. When the parts are arranged as I have shown, I provide for receiving this spreading strain at the strongest part of the link—that is, against the side bars at points in proximity to the cross-bar—this being superior to the keepers of the form of a slight web or lug on the side bars or on the pintle.

That desirable feature of the chain which is due to having the pintles turned inward, and the consequent smooth side edges of the chain, can be preserved if devices other than the stops at b b are used for preventing the bars from moving inward. So, also, on any tendency on the part of the free ends of the side bars to move inward any escape from the inner ends of the pintles will be resisted by the engagement of the extreme ends of the side bars with the adjacent shoulders or stops b b, and as there is liability of the ends of the side bars being thus moved inward upon the pintles it is desirable to have broad wearing or engaging surfaces to receive them, such as are afforded by my construction, in which the entire width of the end bar is made available for that purpose. Of course the tendency to move these free ends of the side bars inward and against the shoulders b b ordinarily results from a different cause from that which tends to spread outward the same ends, and therefore this advantage which my chain possesses over earlier ones is wholly irrespective of the presence of the shoulders of the cross-bar, and would exist in a chain having a straight cross-bar, although in practice I prefer the construction shown.

In Fig. 7 I have shown a form in which links of a modified character are employed, although the same essential arrangement of parts is preserved and the same principle of coupling and uncoupling.

What I claim is—

1. A chain-link having a cross-bar B, formed with stops b b, and having also side bars integral with the cross-bar, the side bars being thin and flexible and provided at their ends adjacent to the cross-bar with inwardly-projecting pintles and with perforated ends adapted to be coupled to the pintles of an adjacent link, and when in working position on said pintles to bear inward toward the stops and outward against the side bars of an adjacent link, substantially as set forth.

2. A chain-link having the cross-bar B, side bars projecting from one side thereof and provided at their free ends with perforations, the link having also the extending parts $a\,a$, each provided with a short inward-turned pintle adapted to receive the perforated ends of the side bars of an adjacent link, whereby the extending parts $a\,a$ are adapted to receive and support outward thrust of the perforated ends of the side bars, substantially as set forth.

In testimony whereof I affix my signature in presence of two witnesses.

CHARLES W. MILLER.

Witnesses:
DAVID SCHERTZER,
JACOB RAPP.